United States Patent
LeBlanc

(10) Patent No.: US 10,597,117 B2
(45) Date of Patent: Mar. 24, 2020

(54) SNOW BIKE HAVING A CENTER OF MASS SUBSTANTIALLY ALIGNED WITH THE CENTER OF MASS OF A RIDER FOR ENHANCED STABILITY

(71) Applicant: Barnabas LeBlanc, Meeker, CO (US)

(72) Inventor: Barnabas LeBlanc, Meeker, CO (US)

(*) Notice: Subject to any disclaimer, the term of this patent is extended or adjusted under 35 U.S.C. 154(b) by 129 days.

(21) Appl. No.: 15/788,276

(22) Filed: Oct. 19, 2017

(65) Prior Publication Data

US 2019/0118904 A1   Apr. 25, 2019

(51) Int. Cl.
*B62M 27/02* (2006.01)

(52) U.S. Cl.
CPC ....... *B62M 27/02* (2013.01); *B62M 2027/021* (2013.01); *B62M 2027/025* (2013.01); *B62M 2027/026* (2013.01); *B62M 2027/027* (2013.01); *B62M 2027/028* (2013.01)

(58) Field of Classification Search
CPC ............ B62M 27/02; B62M 2027/021; B62M 2027/025; B62M 2027/026; B62M 2027/027; B62M 2027/028
See application file for complete search history.

(56) References Cited

U.S. PATENT DOCUMENTS

| | | |
|---|---|---|
| 3,077,238 A | 2/1963 | Nelson |
| 3,362,492 A | 1/1968 | Hansen |
| 3,667,562 A | 6/1972 | Compton |
| 3,783,958 A | 1/1974 | Canavan |
| 3,822,755 A | 7/1974 | Hine |
| 4,286,682 A | 9/1981 | Stewart et al. |
| 4,613,006 A | 9/1986 | Moss et al. |
| 4,823,903 A | 4/1989 | Bibollet et al. |
| 5,474,146 A | 12/1995 | Yoshioka et al. |
| 5,660,245 A | 8/1997 | Marier et al. |
| 6,234,263 B1 | 5/2001 | Boivin et al. |
| 6,302,232 B1 * | 10/2001 | Forbes ................ B62K 3/002 180/191 |

(Continued)

FOREIGN PATENT DOCUMENTS

WO   1999043540 A1   9/1999

OTHER PUBLICATIONS

Website: http://www.diygokarts.com/vb/showthread.php?t=9637 Downloaded Apr. 4, 2017 Snow Bike Conversion.

(Continued)

*Primary Examiner* — Anne Marie M Boehler
*Assistant Examiner* — Marlon A Arce
(74) *Attorney, Agent, or Firm* — Russ Weinzimmer & Associates P.C.

(57) ABSTRACT

A snow bike includes a lightweight engine and transmission to power an endless drive belt (track) around a suspension under the rear of the frame. A unique aspect of the snow bike is that the front/rear weight distribution places less load on the ski and more load on the track, thereby providing lighter steering forces and increased track traction. The snow bike is steered by a fork mounted to a tubular/sheet frame that pivots around an axis and is connected to a ski. The drivetrain directly links the transmission to the track drive wheel, thereby powering the endless track. The centerline of the transmission drive shaft falls to the aft of the drive wheel of the track. This, combined with how the forward track suspension is attached, allows the mass of the track assembly to be more centralized, positioning the center of gravity of the bike nearer to the rider.

17 Claims, 3 Drawing Sheets

(56) References Cited

U.S. PATENT DOCUMENTS

| | | | |
|---|---|---|---|
| 6,431,301 B1 | 8/2002 | Forbes | |
| 7,469,764 B2 | 12/2008 | Girouard et al. | |
| 7,475,751 B2* | 1/2009 | Pard | B62M 27/00 |
| | | | 180/190 |
| 7,694,768 B2 | 4/2010 | Giese et al. | |
| 7,789,183 B2* | 9/2010 | Sadakuni | B62D 55/07 |
| | | | 180/190 |
| 8,596,399 B1 | 12/2013 | Gauld | |
| 8,733,773 B2 | 5/2014 | Sampson | |
| 8,910,738 B2* | 12/2014 | Mangum | B62D 55/04 |
| | | | 180/190 |
| 9,469,327 B2 | 10/2016 | Anderson et al. | |
| 9,643,684 B2* | 5/2017 | Will | B62M 27/02 |
| 2010/0263972 A1* | 10/2010 | Mardollo | B62K 25/08 |
| | | | 188/283 |
| 2012/0222908 A1 | 9/2012 | Mangum | |
| 2016/0114679 A1* | 4/2016 | Brewster | B62D 55/07 |
| | | | 180/190 |
| 2016/0280331 A1 | 9/2016 | Mangum | |
| 2017/0259877 A1* | 9/2017 | Thompson | B60T 7/102 |
| 2018/0251168 A1* | 9/2018 | Mangum | B62M 27/02 |
| 2018/0273142 A1* | 9/2018 | Mangum | B62D 55/07 |

OTHER PUBLICATIONS

Website: https://www.pinterest.com/pin/428334614529620165/ Downloaded Apr. 4, 2017 Photograph of a snow bike.
Website: http://www.snowbikeworld.com/2015/09/cr-500-beast-goeseast Downloaded Apr. 4, 2017 CR500 Snow Bike.
YouTube: https://www.youtube.com/watch?v=DBeMJFtskx8 Downloaded Apr. 5, 2017 Homemade snowbike conversion kit.

\* cited by examiner

SNOW BIKE HAVING A CENTER OF MASS SUBSTANTIALLY ALIGNED WITH THE CENTER OF MASS OF A RIDER FOR ENHANCED STABILITY

FIELD OF THE INVENTION

The present invention relates generally to snow vehicles, and particularly to snow bikes, i.e., motorized snow vehicles, in some respects resembling a motorcycle, having a single seat, handlebars, and a centrally mounted engine, however with a front ski and a rear endless drive traction belt.

BACKGROUND OF THE INVENTION

Snow bikes share overlapping functionality with snowmobiles, and a comparison of the two types of vehicles reveals their relative strengths and weaknesses. Snow bikes are more easily able to operate in technical terrain, which is difficult terrain requiring a high level of technical skill for a snowmobile operator. Snow bikes can more easily ride through off-trail areas, such as carving through deep snow, traversing steep hills (also known as sidehill terrain), and threading through tight spaces, such as between the trees of forested areas. Snow bikes can also more easily navigate the sudden bumps and dips found in technical terrain. They can initiate turns with much less rider input than needed to initiate turns while riding a snowmobile. In fact, much of the off-trail and technical terrain that a snow bike can easily navigate would be difficult or impossible for a conventional snowmobile. The greater agility of a snow bike is made possible in part by having a narrower frame due to having a single ski, a narrower track which encounters less snow resistance, more nimble steering and handling, the ability of a snow bike to lean into a turn, better balance, and lighter weight.

For example, Forbes, U.S. Pat. No. 6,626,258 describes how heavy snowmobiles with outrigger skis cannot effectively traverse steep slopes, whereas snow bikes are very capable of traversing steep slopes.

However, existing snow bikes do have some shortcomings. The lack of fore to aft balance causes the ski to follow existing trails and dart (i.e., to move unpredictably). This lack of balance also does not allow the use of heavier more powerful engines typically found on snowmobiles. The on-trail and long-distance performance of snowmobiles can exceed that of snow bikes. The more comfortable rider position and the larger seating area of a snowmobile can make long trail trips of more than 100 miles more comfortable than with a snow bike. The larger and longer seat allows the snowmobile to comfortably carry a passenger in addition to the driver.

Therefore, snow bikes are often better suited to shorter, performance oriented, off-trail use, while snowmobiles can be better suited to longer journeys on more even, on-trail terrain, where fewer obstacles are encountered.

Single-ski snow bikes have gained in popularity and usability over the last few years due to the availability of better snow bike conversion kits that can convert dirt bikes into snow bikes by adding a front ski and a rear track. For example, Timbersled®, Yeti®, and Arctic Cat® sell conversion kits.

One benefit of snow bike conversion kits is having a vehicle that one can convert back and forth between a dirt bike and a snow bike, effectively providing year-round use by reusing many parts of the motorcycle, such as the engine, transmission, exhaust system, frame, handlebars, and controls.

Snow bike kits allow enhanced maneuverability compared to snowmobiles, but they lack the fore and aft balance of a typical motorcycle or snowmobile, consequently causing handling failures in high g-load situations, such as jumping.

The Timbersled® kit employs a snowmobile-style rear track suspension mounted under an elongated tunnel-style rear chassis. The tunnel and track tread extend rearward a distance of multiple feet, and attach in place of the bike's swing-arm. As is common in snow bike kit conversions, the Timbersled® kit uses a single front ski which is mounted in place of the motorcycle's front wheel. A chain and sprocket transfer power from the bike's engine to a chain-case that in turn drives a jackshaft. A disc brake provides the braking.

The Yeti® kit uses a lightweight molded carbon fiber tunnel with the use of aluminum in key places. Yeti® uses a twin-shock snowmobile-style rear suspension with FOX shocks, and the track is driven using a belt drive that is visible through a clear plastic cover on the outside of the tunnel. The Yeti® tunnel and track also extend rearward a distance of multiple feet.

While there are a lot of aftermarket track and ski kits that bolt onto a dirt bike, some companies sell a complete single-ski snow vehicle from the factory. The Arctic Cat® 450, for example, which is factory built and not a kit, still has many fundamental design features that are similar to snow bikes made from motorcycle conversion kits, such as having a tunnel and track tread that extend rearward a distance of multiple feet behind the driver.

However, kit-style snow bikes can lead to operational instability. For example, U.S. Pat. No. 6,234,263 describes the single ski snow bikes that are in the style of motorcycle kit conversions as having the major drawback of instability. U.S. Pat. Nos. 5,474,146, and 4,613,006 also highlight the problem of instability, both having a rearward extending track.

SUMMARY OF THE INVENTION

The snow bike of the invention provides a track that is permanently attached to the frame, in a factory-made vehicle capable of being balanced fore and aft, as well as having a lower seat height for added safety and maneuverability, and a lower center of gravity.

Thus, the snow bike of the invention has better fore to aft balance than a snow bike made from a kit, and so the ski of the snow bike of the invention will not follow existing trails and dart (move unpredictably). This enhanced balance also permits the use of heavier more powerful engines more commonly found on snowmobiles.

The snow bike includes a short, direct drive drivetrain, as well as a shorter overall length than snow bikes that can be made from a dirt bike using current commercially available snow bike kits. This compact overall length is made possible by permanently securing the track suspension and track assembly directly under the rear part of the bike frame, and also by using a shorter, more direct drive drivetrain.

Specifically, the snow bike of the invention includes a tubular perimeter frame with a track tunnel. The track tunnel and the track suspension are permanently secured directly to the lower rear part of the snow bike frame for compactness. The front members of the frame support a hydraulic suspension dampening fork connected to a ski. The snow bike uses an engine, a transmission, and a drivetrain to rotate an endless drive belt (track) to provide propulsion for the snow bike on a snowy surface.

By combining these features to allow the positioning of much of the track suspension and track assembly under the frame of the snow bike, the center of gravity of the snow bike can be in a more central position, so as to substantially coincide with the fore to aft position of the driver. The resulting improved front/rear weight distribution increases safety and maneuverability.

Another unique aspect of this snow bike is that the above-mentioned forward positioning of the track assembly is combined with a central frame and motor orientation, further improving the front/rear weight distribution, thereby placing a greater percentage of the weight on the rearward track, and lower percentage of weight on the frontward ski, when compared to other snow bike implementations. This improves the snow traction of the rearward track due to the greater weight distribution on the track, and also improves the handling of the front-facing ski due to the lighter weight distribution on the ski.

The snow bike is steered by a fork mounted to a tubular/sheet frame that pivots around an axis and is connected to a ski. The direct drivetrain system directly links the transmission to a PTO (also called "power take off") shaft that drives a chain or belt system, which drives a jackshaft, which turns the track assembly's endless track.

Another aspect of this snow bike which allows a forward center of gravity, and an improved front/rear weight distribution, is the positioning of the jackshaft that drives the track. The jackshaft is positioned forward relative to the transmission PTO shaft (in a fore to aft sense). This allows the entire track assembly to be brought forward with respect to the bike frame, which allows the front to back center of gravity to substantially coincide with the front to back position of the driver, which allows an improved front/rear weight distribution, with resulting increased safety, maneuverability, and traction.

A general aspect of the invention is a motorized snow bike, for conveying a rider over a snow-covered surface. The motorized snow bike includes: a front ski, configured to steer the motorized snow bike; a ski spindle, which is configured to control the front ski; a handlebar assembly, including: a handlebar for steering the motorized snow bike, a pair of hand grips, a clutch control, a throttle control, and a brake control; a triple tree, connected to the handlebar assembly at a handlebar mounting point; a fork assembly, including a front hydraulic suspension, the fork assembly attached to the triple tree, and the fork assembly attached to the ski spindle; an engine, providing propulsion for the motorized snow bike; a seat, configured to support at least some of the body weight of the rider; a track suspension, the track suspension having at least one upper mounting point and at least one lower mounting point; a track assembly including: an endless track belt configured to move the motorized snow bike over a snow surface, a plurality of track wheels and a suspension rail configured to push the endless track belt against the snow surface, the suspension rail connected to the at least one lower mounting point of the track suspension, and a jackshaft connected to a track drive sprocket configured to transmit power to the endless track belt; a bike frame, the bike frame supporting the engine and the seat such that the engine weight and the body weight of the rider are both substantially over the track assembly, the bike frame having direct connected relationship with the track suspension; a track tunnel, the track tunnel being in direct connected relationship with the bike frame; a transmission with a transmission power take off; a direct drivetrain, configured to directly transfer power from the transmission to the track assembly; and a fuel tank.

In some embodiments, the bike frame is made of tubular members.

In some embodiments, the jackshaft is in a forward position relative to the transmission power take off.

In some embodiments, the direct drivetrain includes: a drive chain; an idler bearing; and a sprocket tensioner.

In some embodiments, the track tunnel has a foot peg, and a foot shift lever which controls the transmission.

In some embodiments, a grab handle is attached to the rear of the track tunnel.

In some embodiments, the suspension rail is made of one or more of: aluminum, aluminum alloy, steel, plastic.

Another general aspect of the invention is a motorized snow bike for conveying a rider over a snow-covered surface. This motorized snow bike includes: a front ski, configured to steer the motorized snow bike; a ski spindle, which is configured to control the front ski; a handlebar assembly, including: a handlebar for steering the motorized snow bike, a pair of hand grips, a clutch control, a throttle control, and a brake control; a triple tree, connected to the handlebar assembly at a handlebar mounting point; a fork assembly, including a front hydraulic suspension, with the fork assembly attached to the triple tree, and the fork assembly attached to the ski spindle; an endless track belt, with an endless track belt leading edge at the forward-most position on the endless track belt, where the endless track belt leading edge is less than 12 inches behind the handlebar mounting point; an engine, providing propulsion for the motorized snow bike; a seat, which supports at least some of the body weight of the rider; a track suspension, the track suspension having at least one upper mounting point and at least one lower mounting point; a track assembly, including: the endless track belt configured to move the motorized snow bike over a snow surface, a plurality of track wheels and a suspension rail configured to push the endless track belt against the snow surface, the suspension rail connected to the at least one lower mounting point of the track suspension, and a jackshaft connected to a track drive sprocket configured to transmit power to the endless track belt; a bike frame, the bike frame supporting the engine and the seat such that the engine weight and the body weight of the rider are both substantially over the track assembly, and the bike frame is in direct connected relationship with the track suspension; a track tunnel, the track tunnel being in direct connected relationship with the bike frame; a transmission with a transmission power take off; a direct drivetrain, configured to directly transfer power from the transmission to the track assembly; and a fuel tank.

In some embodiments, the bike frame is made using tubular members.

In some embodiments, the jackshaft is in a forward position relative to the transmission power take off.

In some embodiments, the direct drivetrain includes: a drive chain; an idler bearing; and a sprocket tensioner.

In some embodiments, the track tunnel has a foot peg, and a foot shift lever which controls the transmission.

In some embodiments, a grab handle is attached to the rear of the track tunnel.

In some embodiments, the suspension rail is made from one or more of: aluminum, aluminum alloy, steel, plastic.

Yet another general aspect of the invention is a motorized snow bike that includes: a front ski, configured to steer the motorized snow bike; a ski spindle, configured to control the front ski; a handlebar assembly, including: a handlebar for steering the motorized snow bike, a pair of hand grips, a clutch control, a throttle control, and a brake control; a triple tree, connected to the handlebar assembly at a handlebar mounting point; a fork assembly, including a front hydraulic suspension, the fork assembly attached to the triple tree, and the fork assembly attached to the ski spindle; an endless track belt, having an endless track belt leading edge at the forward-most position on the endless track belt, the endless track belt leading edge being less than 12 inches behind the handlebar mounting point; an engine, providing propulsion for the motorized snow bike; a seat; a track suspension, where the track suspension contains at least one upper mounting point and at least one lower mounting point; a track assembly, including: the endless track belt configured to move the motorized snow bike over a snow surface, a plurality of track wheels and a suspension rail configured to push the endless track belt against the snow surface, the suspension rail connected to the at least one lower mounting point of the track suspension, and a jackshaft connected to a track drive sprocket configured to transmit power to the endless track belt; a bike frame, the bike frame being in direct connected relationship with the track suspension; a track tunnel, the track tunnel being in direct connected relationship with the bike frame; a transmission with a transmission power take off; a direct drivetrain, configured to directly transfer power from the transmission to the track assembly; and a fuel tank.

In some embodiments, the jackshaft is in a forward position relative to the transmission power take off.

In some embodiments, the bike frame is made using tubular members.

In some embodiments, the direct drivetrain includes: a drive chain; an idler bearing; and a sprocket tensioner.

In some embodiments, the track tunnel has a foot peg, and a foot shift lever which controls the transmission.

In some embodiments, a grab handle is attached to the rear of the track tunnel.

In some embodiments, the suspension rail is made of one or more of: aluminum, aluminum alloy, steel, plastic.

BRIEF DESCRIPTION OF THE DRAWINGS

The invention will be more fully understood from the following detailed description, in conjunction with the following figures, wherein.

DETAILED DESCRIPTION

Figure 1:
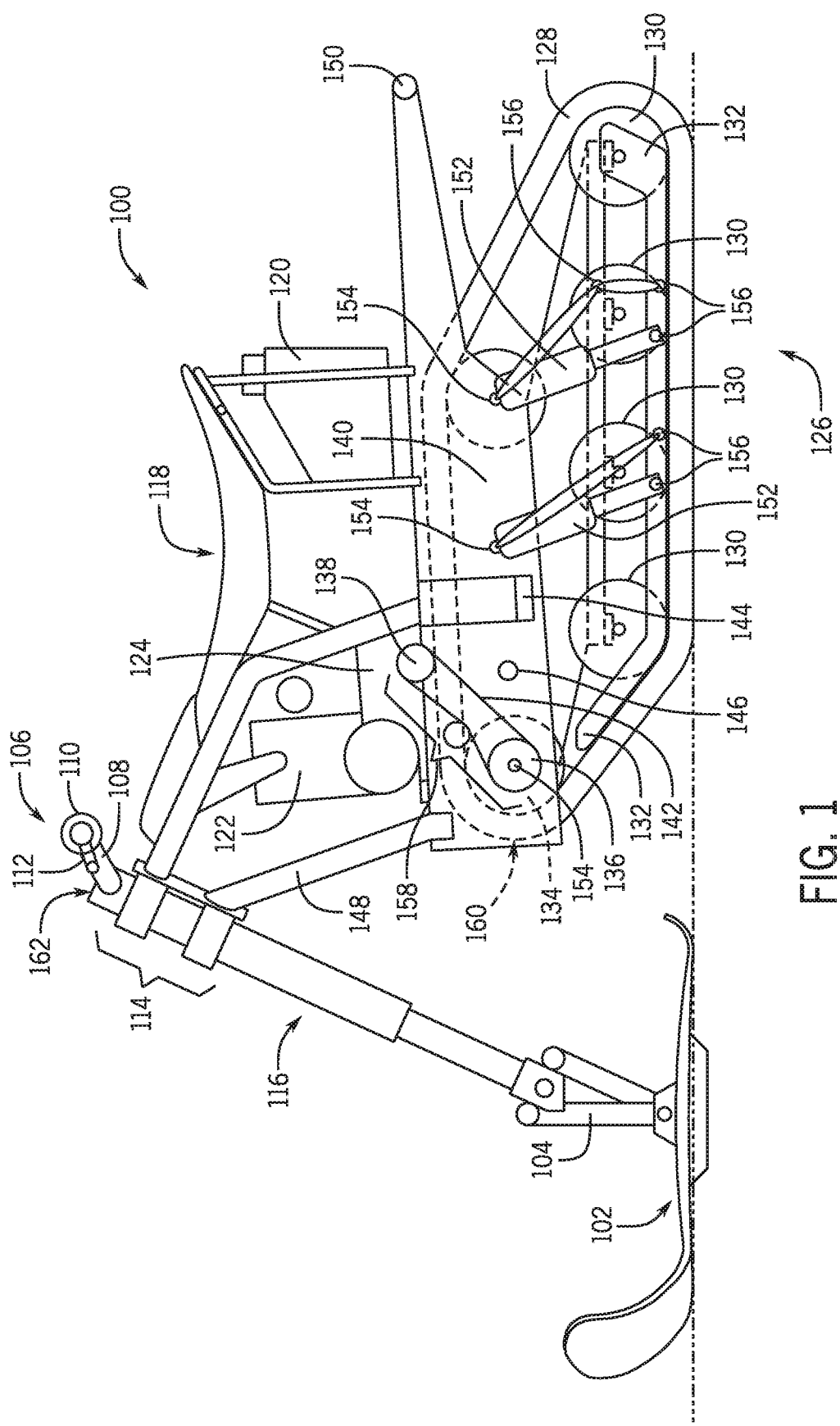
FIG. 1 is a side view of the motorized snow bike.

FIG. 1 shows the motorized snow bike 100 having a front ski 102, a ski spindle 104, a handlebar assembly 106, a handlebar 108, a pair of hand grips 110, a throttle control and brake control 112, a triple tree 114, a fork assembly 116, a seat 118, a fuel tank 120, an engine 122, a transmission 124, a track assembly 126, an endless track belt 128, a plurality of track wheels 130, a suspension rail 132, a track drive sprocket 134, a jackshaft 136, a drive shaft 138, a track tunnel 140, a drive chain 142, a foot peg 144, a foot shift lever 146, a bike frame 148, a grab handle 150, a track suspension 152, an at least one suspension upper mounting point 154, at least one suspension lower mounting point 156, a direct drivetrain 158, an endless track belt leading edge 160, and a handlebar mounting point 162.

In this embodiment, the front ski 102 is controlled by the ski spindle 104. The front ski 102 steers the motorized snow bike 100 across the snow surface. The ski spindle 104 is attached to the fork assembly 116, which in this embodiment has a front hydraulic suspension to cushion the ride of the motorized snow bike 100. The top of the fork assembly 116 is attached to the triple tree 114, which is in turn attached to the bike frame 148. The top of the triple tree 114 is joined to the handlebar assembly 106. The handlebar assembly 106 contains the handlebar 108, which when turned also turns the fork assembly 116, which results in changing the direction of the ski spindle 104 and the front ski 102, which changes the direction of the motorized snow bike 100. In this embodiment, the handlebar assembly 106, the fork assembly 116, the ski spindle 104, and the attachment point of the front ski 102 are all in substantially collinear alignment.

In this embodiment, the handlebar assembly 106 also contains controls that are essential for operating the motorized snow bike 100: the throttle control and brake control 112, and the pair of hand grips 110 for gripping the handlebar 108. The triple tree 114 is fixedly attached to the bike frame 148, and the triple tree 114 has the function of holding the handlebar assembly 106 in place as it turns the fork assembly 116. The handlebar assembly 106 and the handlebar 108 are attached to the triple tree 114 at the handlebar mounting point 162.

The bike frame 148 provides structural support for the seat 118, and also the weight of the operator (not shown), who sits on the seat 118. In addition, the bike frame 148 supports the engine 122, the transmission 124, and the fuel tank 120. In this embodiment, the bike frame 148 is also fixedly attached to the track tunnel 140.

The track tunnel 140 has multiple functions. The track tunnel 140 prevents snow from washing up onto the operator, and provides protection for the operator's legs from the moving parts of the track assembly 126, since the top part of the track assembly 126 is covered by the track tunnel 140. The track tunnel 140 in this embodiment is also the fixed attachment point for the at least one suspension upper mounting point 154. This means that the track tunnel 140 has to be of sufficiently sturdy construction to support the forces exerted upon the track tunnel 140 (and the fixedly connected bike frame 148) by the track assembly 126.

In this embodiment, the bike frame 148 includes the track tunnel 140, where the track tunnel 140 is in a direct connected relationship with the bike frame 148. In this embodiment, the track suspension 152 suspends the track tunnel 140, and thereby the bike frame 148, above the suspension rail 132. The track suspension 152 has at least one suspension upper mounting point 154, and at least one suspension lower mounting point 156. Between the two mounting points, the track suspension 152 can include at least one spring, and at least one shock absorber to provide a flexible and durable suspension of the motorized snow bike 100.

The at least one suspension lower mounting point 156 is connected to the suspension rail 132. The suspension rail 132 holds the plurality of track wheels 130 in a fixed relationship to each other. The suspension rail 132 and the plurality of track wheels 130 cooperate to push the endless track belt 128 against the snow surface, and provide traction for the endless track belt 128 against the snow surface.

Power is transferred from the transmission 124, through the drive shaft 138, to the track assembly 126 via the direct drivetrain 158. The direct drivetrain 158 can be configured to use the drive chain 142, which transfers power to the jackshaft 136 and to the track drive sprocket 134.

In this embodiment, the jackshaft 136 is in a forward position relative to the drive shaft 138 and the transmission power take off.

The region of the endless track belt 128, which is positioned farthest forward on the motorized snow bike 100, is the endless track belt leading edge 160.

The handlebar 108 is attached to the triple tree 114 at the handlebar mounting point 162.

In this embodiment, the endless track belt leading edge 160 is less than 12 inches behind the handlebar mounting point 162.

In this embodiment, the bike frame 148 also has the foot peg 144 for resting the operator's foot, and the foot shift lever 146 to enable shifting the gears of the transmission 124.

In this embodiment, the grab handle 150 is attached to the rear of the track tunnel 140.

In some embodiments, the bike frame 148 is made of tubular construction.

Motorized Snow Bike Power Train

Figure 2:
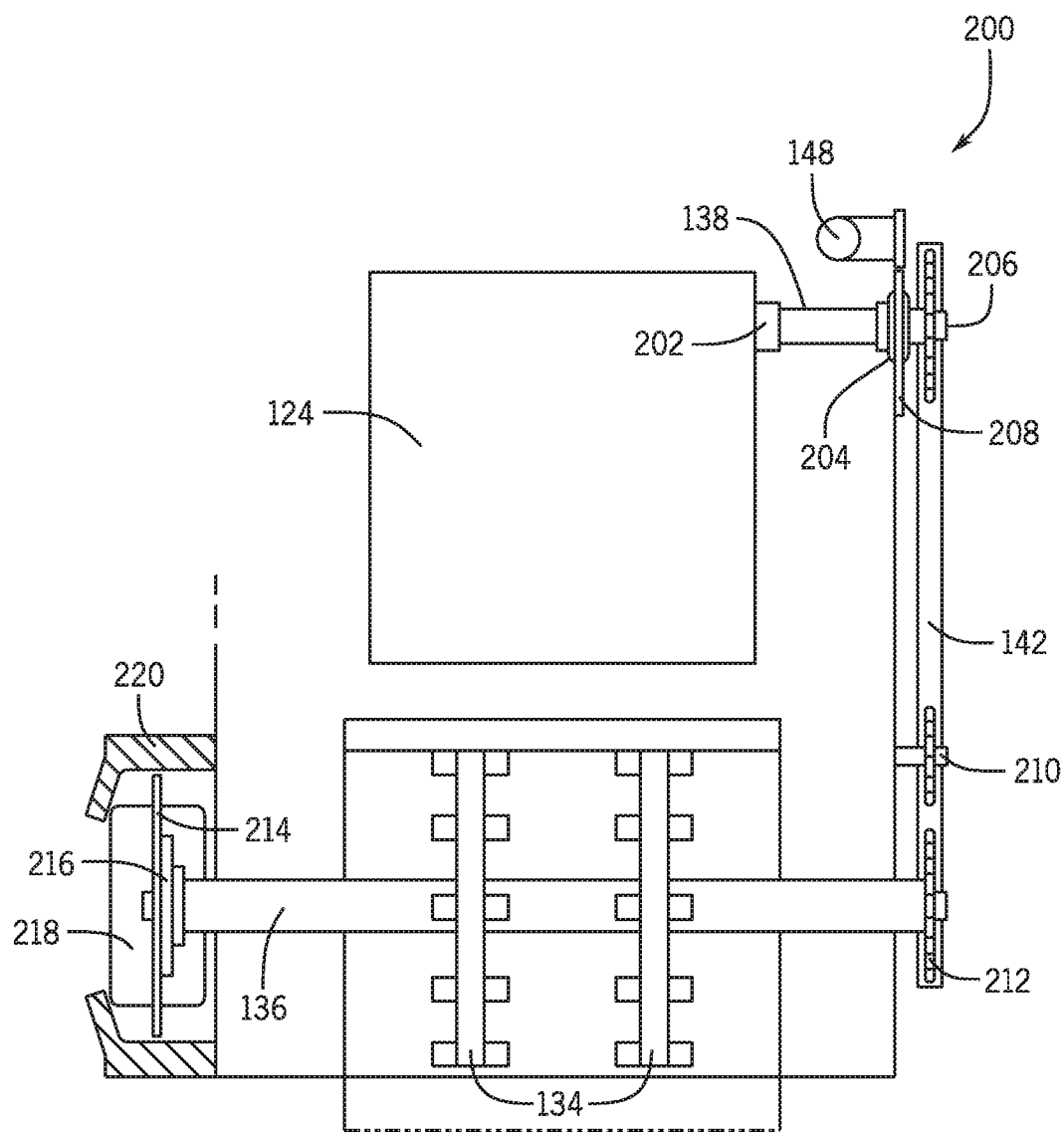
FIG. 2 is a cross-sectional view of the transmission power take off mechanism, the chain, the jackshaft, the track drive sprockets, and the brake assembly of the motorized snow bike of FIG. 1.

FIG. 2 shows a transmission 124, a track drive sprocket 134, a jackshaft 136, a drive shaft 138, a drive chain 142, a bike frame 148, a transmission PTO 202, a lockable bearing 204, a transmission side drive sprocket 206, a support bracket 208, a sprocket tensioner 210, a jackshaft sprocket 212, a brake disk 214, a brake hub 216, a brake caliper 218, and a brake frame 220.

In this embodiment, the transmission 124 is connected to the transmission PTO 202 (transmission power take-off), which is connected to the drive shaft 138. The drive shaft 138 passes through a pair of the lockable bearing 204. Each lockable bearing 204 is supported by the support bracket 208, which is held in place by the bike frame 148. The transmission side drive sprocket 206 transmits power from the transmission 124 and the transmission PTO 202 to the drive chain 142. The sprocket tensioner 210 maintains the proper tension on the drive chain 142. The power from the transmission 124 is ultimately transferred to the jackshaft sprocket 212 and to the jackshaft 136, which transmits power to the at least one-track drive sprocket 134.

In this embodiment, the brake is controlled by the brake control located on the handlebar assembly. The braking action is created by the brake caliper 218 squeezing against the brake disk 214, which slows the rotation of the brake hub 216 which is connected to the jackshaft 136, so the rotation of the jackshaft 136 and the track drive sprocket 134 are slowed, which brakes the motorized snow bike. The brake frame 220 protects the brake components from moisture, ice, snow, and debris. The brake frame 220 also supports the brake caliper 218.

The Direct Drivetrain

Figure 3:
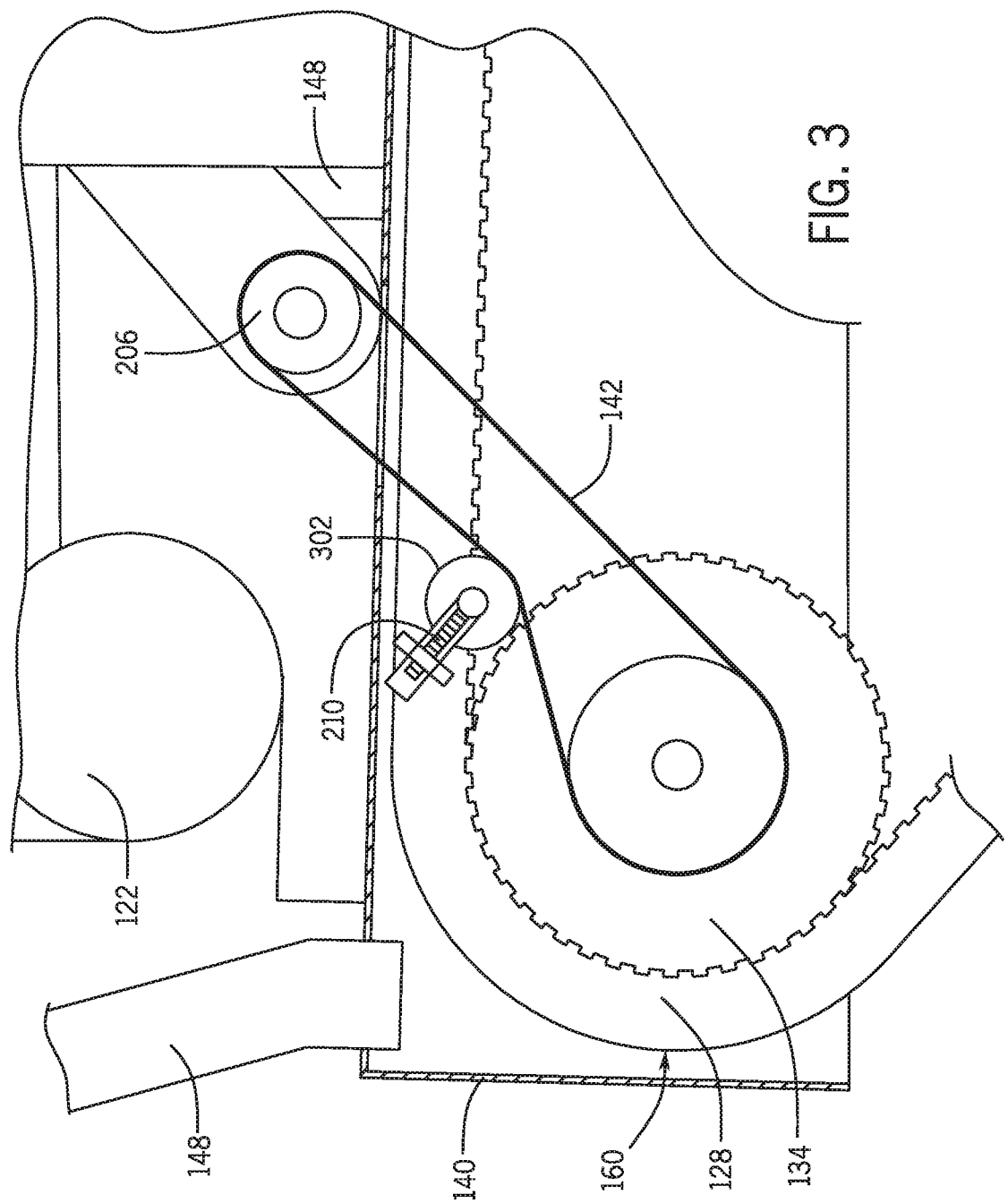
FIG. 3 is a cross-sectional view of the bike frame, the track tunnel, the engine, the drive train, the track drive sprocket, and the endless track belt of the snow bike of FIG. 1.

FIG. 3 shows an engine 122, an endless track belt 128, a track drive sprocket 134, a track tunnel 140, a drive chain 142, a bike frame 148, a transmission side drive sprocket 206, a sprocket tensioner 210, and an idler bearing 302.

For this embodiment, the direct drivetrain 158 is shown in detail. The engine 122 powers the transmission side drive sprocket 206. The engine 122, the transmission side drive sprocket 206, and the track tunnel 140 are supported by the bike frame 148. The direct drivetrain 158 includes: the transmission side drive sprocket 206, the drive chain 142, the idler bearing 302, and the sprocket tensioner 210. The direct drivetrain 158 transmits the power to the track drive sprocket 134, which in turn transmits the power to the endless track belt 128. Both the track drive sprocket 134 and the endless track belt 128 have interlocking tooth-like gripping structures that assist in transmitting the power.

Other modifications and implementations will occur to those skilled in the art without departing from the spirit and the scope of the invention as claimed. Accordingly, the above description is not intended to limit the invention, except as indicated in the following claims.

What is claimed is:

1. A motorized snow bike, for conveying a rider over a snow covered surface, the rider being characterized by a body weight of the rider, the motorized snow bike comprising:
    a front ski, configured to steer the motorized snow bike;
    a ski spindle, which is configured to control the front ski;
    a handlebar assembly, including: a handlebar for steering the motorized snow bike, a pair of hand grips, a clutch control, a throttle control, and a brake control;
    a triple tree, connected to the handlebar assembly at a handlebar mounting point;
    a fork assembly, including a front hydraulic suspension, the fork assembly attached to the triple tree, and the fork assembly attached to the ski spindle;
    an engine, providing propulsion for the motorized snow bike;
    a seat, configured to support at least some of the body weight of the rider;
    a track suspension, the track suspension having at least one upper mounting point and at least one lower mounting point;
    a track assembly including: an endless track belt configured to move the motorized snow bike over a snow surface, a plurality of track wheels and a suspension rail configured to push the endless track belt against the snow surface, the suspension rail connected to the at least one lower mounting point of the track suspension, and a jackshaft connected to a track drive sprocket configured to transmit power to the endless track belt;
    a bike frame, the bike frame supporting the engine and the seat such that the engine weight and the body weight of the rider are both substantially over the track assembly, the bike frame having direct connected relationship with the track suspension;
    a track tunnel, the track tunnel being in direct connected relationship with the bike frame;
    a transmission with a transmission power take off, the jackshaft being in a forward position relative to the transmission power take off;
    a direct drivetrain, configured to directly transfer power from the transmission to the track assembly; and
    a fuel tank.

2. The motorized snow bike of claim 1, wherein the bike frame is made of tubular members.

3. The motorized snow bike of claim 1, wherein the direct drivetrain includes: a drive chain; an idler bearing; and a sprocket tensioner.

4. The motorized snow bike of claim 1, wherein the track tunnel has a foot peg, and a foot shift lever which controls the transmission.

5. The motorized snow bike of claim 1, wherein a grab handle is attached to the rear of the track tunnel.

6. The motorized snow bike of claim 1, wherein the suspension rail is made of one or more of: aluminum, aluminum alloy, steel, plastic.

7. A motorized snow bike, for conveying a rider over a snow-covered surface, the rider being characterized by a body weight of the rider, the motorized snow bike comprising:
- a front ski, configured to steer the motorized snow bike;
- a ski spindle, which is configured to control the front ski;
- a handlebar assembly, including: a handlebar for steering the motorized snow bike, a pair of hand grips, a clutch control, a throttle control, and a brake control;
- a triple tree, connected to the handlebar assembly at a handlebar mounting point;
- a fork assembly, including a front hydraulic suspension, with the fork assembly attached to the triple tree, and the fork assembly attached to the ski spindle;
- an endless track belt, with an endless track belt leading edge at the forward-most position on the endless track belt, where the endless track belt leading edge is less than 12 inches behind the handlebar mounting point;
- an engine, providing propulsion for the motorized snow bike;
- a seat, which supports at least some of the body weight of the rider;
- a track suspension, the track suspension having at least one upper mounting point and at least one lower mounting point;
- a track assembly, including: the endless track belt configured to move the motorized snow bike over a snow surface, a plurality of track wheels and a suspension rail configured to push the endless track belt against the snow surface, the suspension rail connected to the at least one lower mounting point of the track suspension, and a jackshaft connected to a track drive sprocket configured to transmit power to the endless track belt;
- a bike frame, the bike frame supporting the engine and the seat such that the engine weight and the body weight of the rider are both substantially over the track assembly, and the bike frame is in direct connected relationship with the track suspension;
- a track tunnel, the track tunnel being in direct connected relationship with the bike frame;
- a transmission with a transmission power take off;
- a direct drivetrain, configured to directly transfer power from the transmission to the track assembly, the direct drivetrain including a drive chain, an idler bearing, and a sprocket tensioner; and
- a fuel tank.

8. The motorized snow bike of claim 7, wherein the bike frame is made using tubular members.

9. The motorized snow bike of claim 7, wherein the jackshaft is in a forward position relative to the transmission power take off.

10. The motorized snow bike of claim 7, wherein the track tunnel has a foot peg, and a foot shift lever which controls the transmission.

11. The motorized snow bike of claim 7, wherein a grab handle is attached to the rear of the track tunnel.

12. The motorized snow bike of claim 7, wherein the suspension rail is made from one or more of: aluminum, aluminum alloy, steel, plastic.

13. A motorized snow bike, the motorized snow bike comprising:
- a front ski, configured to steer the motorized snow bike;
- a ski spindle, configured to control the front ski;
- a handlebar assembly, including: a handlebar for steering the motorized snow bike, a pair of hand grips, a clutch control, a throttle control, and a brake control;
- a triple tree, connected to the handlebar assembly at a handlebar mounting point;
- a fork assembly, including a front hydraulic suspension, the fork assembly attached to the triple tree, and the fork assembly attached to the ski spindle;
- an endless track belt, having an endless track belt leading edge at the forward-most position on the endless track belt, the endless track belt leading edge being less than 12 inches behind the handlebar mounting point;
- an engine, providing propulsion for the motorized snow bike;
- a seat;
- a track suspension, where the track suspension contains at least one upper mounting point and at least one lower mounting point;
- a track assembly, including: the endless track belt configured to move the motorized snow bike over a snow surface, a plurality of track wheels and a suspension rail configured to push the endless track belt against the snow surface, the suspension rail connected to the at least one lower mounting point of the track suspension, and a jackshaft connected to a track drive sprocket configured to transmit power to the endless track belt;
- a bike frame, the bike frame being in direct connected relationship with the track suspension;
- a track tunnel, the track tunnel being in direct connected relationship with the bike frame;
- a transmission with a transmission power take off, the jackshaft being in a forward position relative to the transmission power take off;
- a direct drivetrain, configured to directly transfer power from the transmission to the track assembly; and
- a fuel tank.

14. The motorized snow bike of claim 13, wherein the bike frame is made using tubular members.

15. The motorized snow bike of claim 13, wherein the direct drivetrain includes: a drive chain; an idler bearing; and a sprocket tensioner.

16. The motorized snow bike of claim 13, wherein the track tunnel has a foot peg, and a foot shift lever which controls the transmission.

17. The motorized snow bike of claim 13, wherein a grab handle is attached to the rear of the track tunnel.

* * * * *